(12) United States Patent
Sato et al.

(10) Patent No.: US 7,156,418 B2
(45) Date of Patent: Jan. 2, 2007

(54) METHOD FOR FOLDING AIRBAG, AIRBAG APPARATUS, AND AIRBAG

(75) Inventors: Eiji Sato, Aichi-ken (JP); Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 189 days.

(21) Appl. No.: 10/891,043

(22) Filed: Jul. 15, 2004

(65) Prior Publication Data

US 2005/0023808 A1 Feb. 3, 2005

(30) Foreign Application Priority Data

Jul. 31, 2003 (JP) ............................. 2003-284100

(51) Int. Cl.
*B60R 21/16* (2006.01)
(52) U.S. Cl. .................................. 280/730.2
(58) Field of Classification Search ............. 280/730.2, 280/730.1, 743.1
See application file for complete search history.

(56) References Cited

U.S. PATENT DOCUMENTS 5,492,367 A * 2/1996 Albright et al. ......... 280/743.1
5,927,750 A * 7/1999 Nakamura et al. ....... 280/730.2

FOREIGN PATENT DOCUMENTS

JP A-9-272393 10/1997

\* cited by examiner

*Primary Examiner*—Faye M. Fleming
(74) *Attorney, Agent, or Firm*—Posz Law Group, PLC

(57) ABSTRACT

An airbag has a lower expansion portion, a central expansion portion, and an upper expansion portion. When the airbag is deployed, the lower expansion portion corresponds to the lumbar region of an occupant, the central expansion portion corresponds to the abdomen of the occupant, and the upper expansion portion corresponds to a shoulder of the occupant. The lower expansion portion is folded upward to be tucked in a pair of fabric sheets forming the central expansion portion. After tucking, the airbag is folded to form a bellows-like portion such that the distal end of the airbag approaches an inflator located in the proximal end of the airbag. After folding to form the bellows-like portion part of the bellows-like portion that corresponds to the upper expansion portion, which has not been tucked, is bent downward substantially by 180° so that the part contacts the front side of part of the bellows-like portion that corresponds to the central expansion portion. Accordingly, irrespective of the positions of a joined section or a narrow section, the packaged size of the folded airbag is made compact.

12 Claims, 6 Drawing Sheets

METHOD FOR FOLDING AIRBAG, AIRBAG APPARATUS, AND AIRBAG

BACKGROUND OF THE INVENTION

The present invention relates to a method for folding an airbag that is attached, for example, to a side of a vehicle seat, an airbag folded in such a manner, and to an airbag apparatus that is equipped with the airbag.

The airbag of an airbag apparatus of this type is incorporated in a side of the backrest of a seat in a folded state. When an impact that is equal to or greater than a predetermined level is applied to the vehicle, the airbag is inflated and deployed between a sidewall of the vehicle body and the seat. The inflated and deployed airbag separates the lumbar region, the abdomen, and a shoulder of an occupant from the sidewall of the vehicle body, and absorbs impact applied to the vehicle body.

In such an airbag apparatus, the airbag is incorporated in the backrest of the seat in a folded state. For example, Japanese Laid-Open Patent Publication No. 9-272393 discloses an invention related to a method for folding an airbag having expansion portions.

In the airbag apparatus disclosed in the publication, an airbag 101 has a central expansion portion 102, an upper expansion portion 103, and a lower expansion portion 104 as shown in FIG. 13(a). The upper expansion portion 103 is inflated upward above the central expansion portion 102, and the lower expansion portion 104 is inflated downward below the central expansion portion 102. Then, as shown in FIG. 13(b), the airbag 101 is folded with the upper expansion portion 103 and the lower expansion portion 104 tucked in the central expansion portion 102 from above and below. That is, the upper expansion portion 103 and the lower expansion portion 104 are tucked in the central expansion portion 102 while being brought closer to each other. Subsequently, as shown in FIG. 13(c), the airbag 101 is folded to form a bellows-like portion toward a proximal end 105.

When expansion gas is supplied to the interior of the airbag 101 folded in the above described manner, the portion folded in a bellows is unfolded along a deploying direction indicated by arrow A in FIG. 13(c). Since the upper expansion portion 103 and the lower expansion portion 104 are each folded at a folding line 107 that extends from the proximal end 105 to a distal end 106 and is parallel to the deploying direction, the upper expansion portion 103 and the lower expansion portion 104 are inflated upward and downward substantially simultaneously when the bellows-like portion is unfolded.

In the method for folding airbag according to the prior art, the lower expansion portion 104 and the upper expansion portion 103 are each tucked into the central expansion portion 102 by folding the airbag at the folding lines 107, which extend along the deploying direction of the airbag 101. Therefore, the size of a portion of the airbag 101 that can be tucked inward is limited if a joint section, where facing portions of the airbag are fastened to each other, is formed in the lower or upper expansion portions 104, 103, or if a narrow section, where the thickness of the airbag when inflated is less than the other portions, is formed. In such a case, the packaged size of the airbag after being folded cannot be more compact beyond a certain limit.

SUMMARY OF THE INVENTION

Accordingly, it is an objective of the present invention to provide a method for folding an airbag, which method reduces the size of the folded airbag even if a joint section and narrow section are provided, and to provide an airbag folded according to the method and an airbag apparatus incorporating the airbag.

To achieve the foregoing and other objectives and in accordance with the purpose of the present invention, a method for folding an airbag attached to a side of a vehicle seat is provided. The airbag is deployed and inflated from the side of the seat in a predetermined first direction such that the airbag is located between a sidewall of a body of the vehicle and an occupant seated on the seat. With respect to the first direction, the airbag has a proximal end close to the side of the seat and a distal end separated from the side of the seat. The airbag includes a lower expansion portion, a central expansion portion, and an upper expansion portion. When the airbag is deployed, the lower expansion portion corresponds to the lumbar region of the occupant seated on the seat, the central expansion portion corresponds to the abdomen of the occupant, and the upper expansion portion corresponds to a shoulder of the occupant. With respect to a second direction that intersects the first direction, the lower expansion portion and the upper expansion portion are located at the sides of the central expansion portion. The method includes: folding the lower expansion portion or the upper expansion portion along a folding line that extends along the first direction such that the folded expansion portion is tucked in the central expansion portion; folding the airbag to form a bellows-like portion after tucking the expansion portion, such that the distal end and the proximal end of the airbag approach each other and that folded layers are laminated along the first direction; and after forming the bellows-like portion, bending a part of the bellows-like portion that corresponds to the untucked one of the lower and upper expansion portions substantially by 180° within a plane containing the first and second directions, so that the bent part approaches a part of the bellows-like portion that corresponds to the central expansion portion.

The present invention also provides an airbag apparatus for a vehicle that has an airbag and a gas supplying device and is attached to a side of a vehicle seat. When gas is supplied to the airbag from the gas supplying device, the airbag is deployed and inflated from the side of the seat in a predetermined first direction such that the airbag is located between a sidewall of a body of the vehicle and an occupant seated on the seat. With respect to the first direction, the airbag has a proximal end close to the side of the seat and a distal end separated from the side of the seat. The airbag includes a lower expansion portion, a central expansion portion, and an upper expansion portion. The lower expansion portion corresponds to the lumbar region of the occupant seated on the seat when the airbag is deployed. The central expansion portion corresponds to the abdomen of the occupant when the airbag is deployed. The upper expansion portion corresponds to a shoulder of the occupant when the airbag is deployed. With respect to a second direction that intersects the first direction, the lower expansion portion and the upper expansion portion are located at the sides of the central expansion portion. Prior to deployment, the airbag is folded in a predetermined manner, in which the lower expansion portion or the upper expansion portion is folded along a folding line that extends along the first direction such that the folded expansion portion is tucked in the central expansion portion, the airbag is folded to form a bellows-like portion such that the distal end and the proximal end approach each other and that folded layers are laminated along the first direction. A part of the bellows-like portion that corresponds to the untucked one of the lower and upper expansion portions is bent substantially by 180° within a plane containing the first and second directions, so that the bent part approaches a part of the bellows-like portion that corresponds to the central expansion portion.

The present invention also provides an airbag attached to a side of a vehicle seat. The airbag is deployed and inflated from the side of the seat in a predetermined first direction such that the airbag is located between a sidewall of a body of the vehicle and an occupant seated on the seat. With respect to the first direction, the airbag has a proximal end close to the side of the seat and a distal end separated from the side of the seat. The airbag includes a lower expansion portion, a central expansion portion, and an upper expansion portion. When the airbag is deployed, the lower expansion portion corresponds to the lumbar region of the occupant seated on the seat, the central expansion portion corresponds to the abdomen of the occupant, and the upper expansion portion corresponds to a shoulder of the occupant. With respect to a second direction that intersects the first direction, the lower expansion portion and the upper expansion portion are located at the sides of the central expansion portion. Prior to deployment, the airbag is folded in a predetermined manner, in which the lower expansion portion or the upper expansion portion is folded along a folding line that extends along the first direction such that the folded expansion portion is tucked in the central expansion portion, the airbag is folded to form a bellows-like portion such that the distal end and the proximal end approach each other and that folded layers are laminated along the first direction. A part of the bellows-like portion that corresponds to the untucked one of the lower and upper expansion portions is bent substantially by 180° within a plane containing the first and second directions, so that the bent part approaches a part of the bellows-like portion that corresponds to the central expansion portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 13(a) to 13(c) are side views for explaining a prior art method for folding airbag.

DETAILED DESCRIPTION OF THE PREFERRED EMBODIMENTS

One embodiment according to the present invention will now be described with reference to FIGS. 1 to 11.

Figure 1:
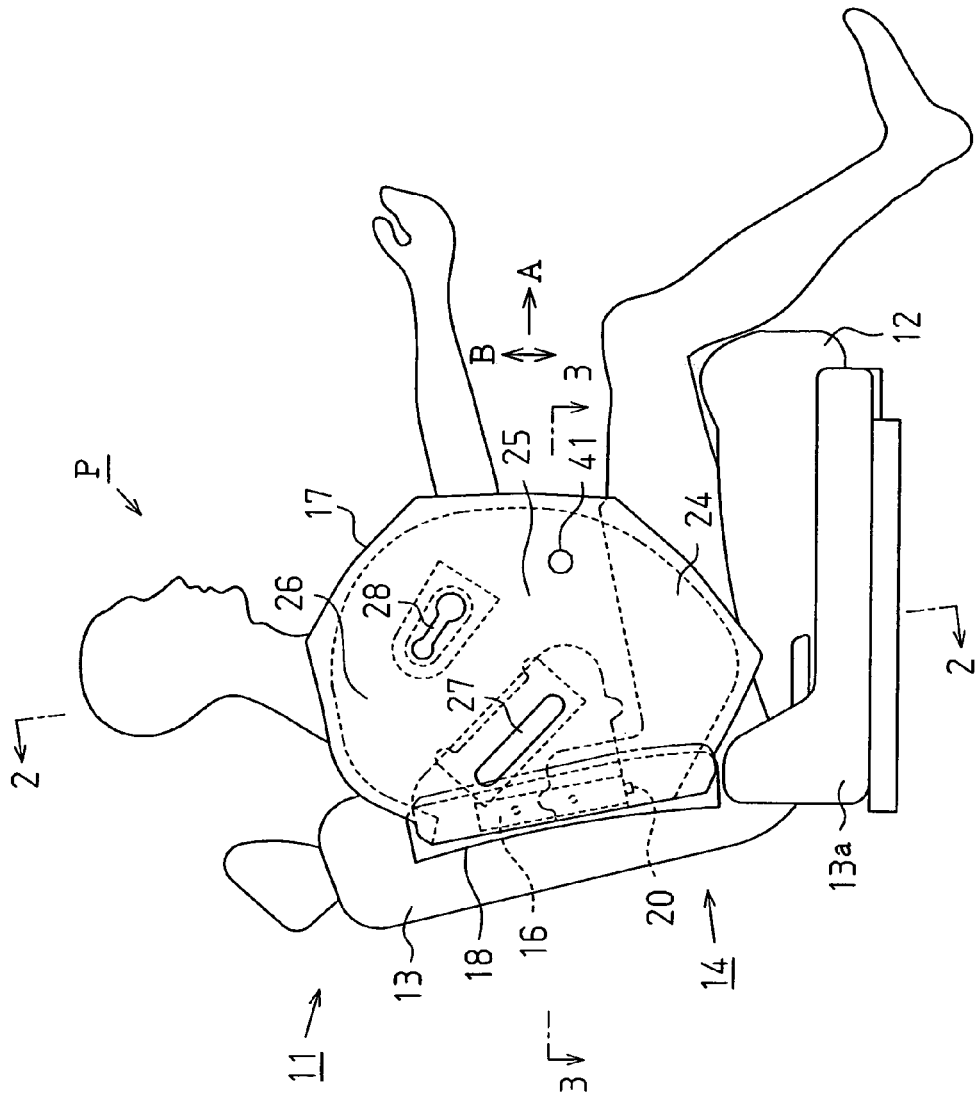
FIG. 1 is a side view illustrating an airbag apparatus according to one embodiment of the present invention.
Figure 3:
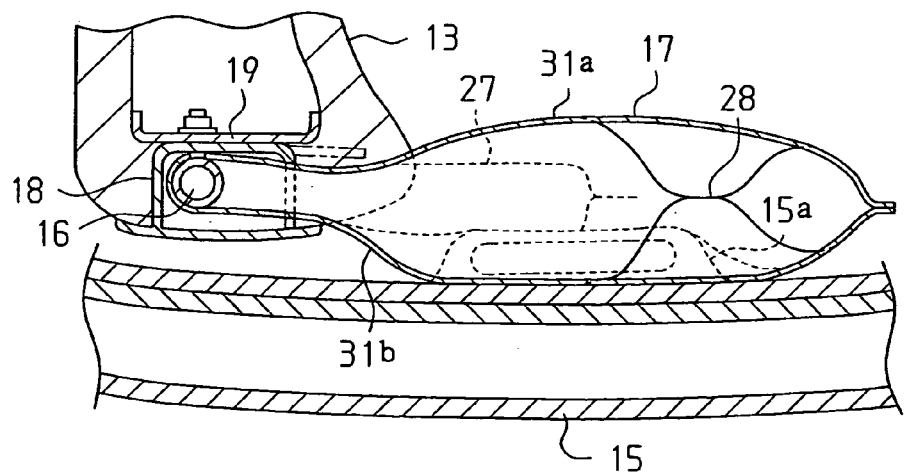
FIG. 3 is a cross-sectional view taken along line 3-3 of FIG. 1.

FIG. 1 illustrates a seat 11 located in a passenger compartment defined in a vehicle body. The seat 11 is a front right seat. The seat 11 includes a seat portion 12 and a backrest 13. As shown in FIGS. 1 and 3, an airbag apparatus 14 for a side collision is incorporated in the backrest 13. Specifically, the airbag apparatus 14 is incorporated in a side of the backrest 13 that faces a door 15 that forms part of the sidewall of the vehicle body (see FIG. 3). A reclining mechanism cover 13a is provided at the lower end of the backrest 13 to cover a reclining mechanism for adjusting the angle of the backrest 13.

The airbag apparatus 14 includes a gas supplying device, which is an inflator 16, and an airbag 17 covering the inflator 16, and a case 18 for accommodating the inflator 16 and the airbag 17.

As shown in FIG. 3, the case 18 is fixed to an inner frame 19 of the backrest 13. As shown in FIG. 1, the inflator 16 is filled with compressed gas for inflating the airbag 17 when the airbag apparatus 14 is activated. The inflator 16 also has a gas port 20 for injecting compressed gas into the airbag 17. With this configuration, the inflator 16 injects expanded gas into the airbag 17 when the airbag apparatus 14 is activated.

The vehicle includes an impact sensor (not shown) and a control circuit (not shown). When an impact the magnitude of which is equal to or greater than a predetermined level, the impact sensor outputs a signal. Based on the output of the signal from the impact sensor, the control circuit sends an activation signal to the airbag apparatus 14. When the airbag apparatus 14 receives the activation signal, the inflator 16 supplies the compressed gas stored therein to the airbag 17 through the gas port 20.

Figure 2:
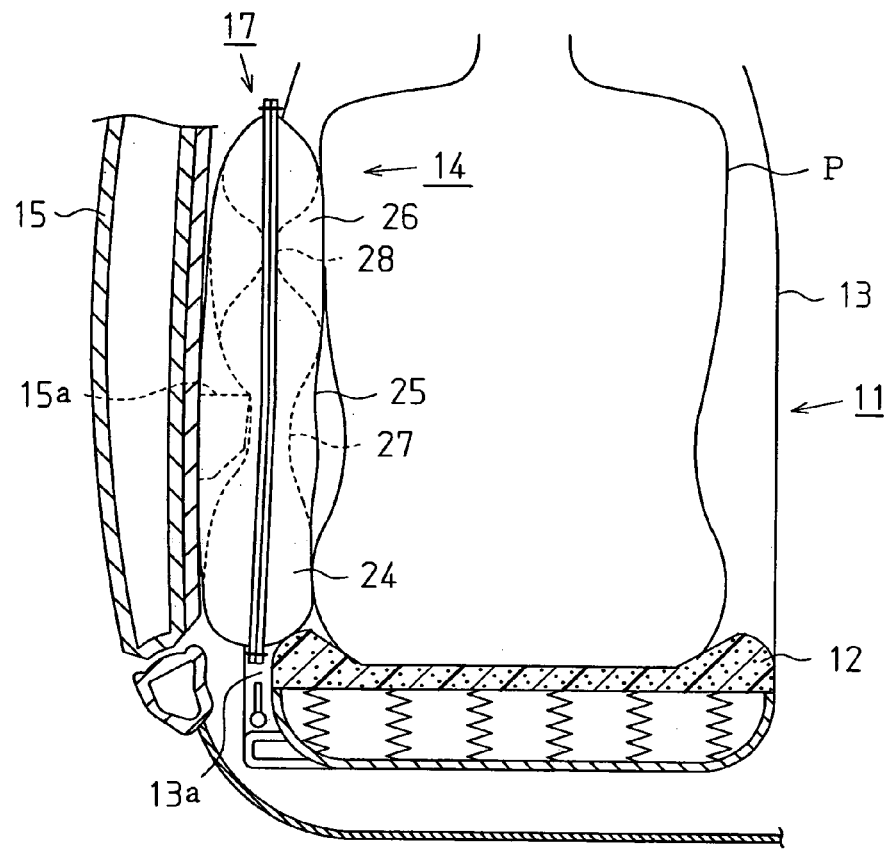
FIG. 2 is a cross-sectional view taken along line 2-2 in FIG. 1.

The airbag 17 is formed by sewing a pair of fire-proof woven fabric sheets, or an inside fabric sheet 31a and an outside fabric sheet 31b, with a sewing thread 40. The inside fabric sheet 31a faces inward of the passenger compartment, and the outside fabric sheet 31b faces outward of the passenger compartment. When the airbag apparatus 14 does not operate, the airbag 17 is accommodated in the case 18 in a folded state. As shown in FIGS. 1 to 3, the airbag 17 is deployed and inflated in a direction away from the side of the seat 11 (direction of arrow A in FIG. 1) to be located between an occupant P on the seat 11 and the door 15.

As shown in FIGS. 1 and 2, the airbag 17 includes a lower expansion portion 24, a central expansion portion 25, and an upper expansion portion 26. The lower expansion portion 24 is inflated and deployed in a position that corresponds to the lumbar region of the occupant. The central expansion portion is located above the lower expansion portion, and is expanded and deployed in a position that corresponds to the abdomen of the occupant. The upper expansion portion is located above the central expansion portion 25 and is inflated and deployed in a position that corresponds to a shoulder of the occupant. As shown in FIG. 1, the airbag 17 is deployed in a direction indicated by arrow A (first direction). The lower expansion portion 24 and the upper expansion portion 26 are located on the sides of the central expansion portion 25 with respect to a second direction (see arrow B) that intersects the first direction.

Figure 4:
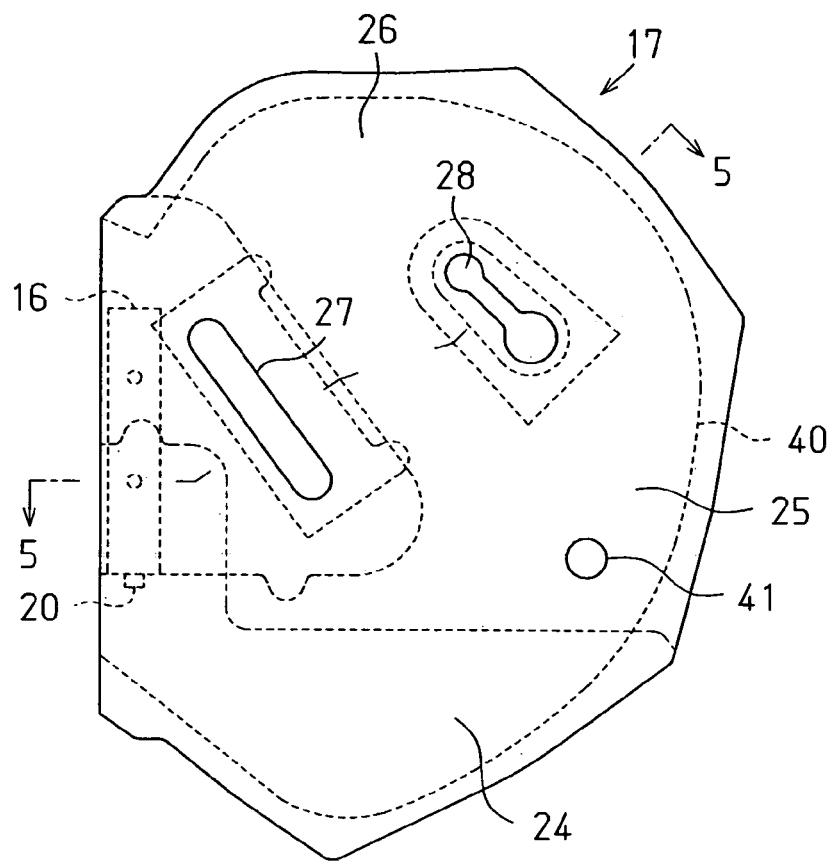
FIG. 4 is a front view showing the airbag of FIG. 1.

As shown in FIGS. 1 to 3, the central expansion portion 25 has a narrow section 27 in a part that is close to the inflator 16 and corresponds to an armrest 15a of the door 15. When the airbag 17 is inflated, the narrow section 27 has a less thickness than the other portions and functions as a gas flow controlling section that controls the flow of gas. As shown in FIG. 4, the narrow section 27 extends in a proximal part (a part close to the inflator 16) of the central expansion portion 25 of the airbag 17 to diagonally partition the proximal section. The narrow section 27 controls the flow of expanded gas from the inflator 16 to advance toward the lower expansion portion 24. The narrow section 27 also prevents the central expansion portion 25 from being excessively protruded toward the abdomen of the occupant by the armrest 15a.

The airbag 17 also has a joined section 28 in the upper expansion portion 26. The joined section 28 corresponds to a shoulder of the occupant and is formed by fastening parts of the fabric sheets 31a, 31b to each other. The joined section 28 prevents the shoulder of the occupant from being excessively pressed by the airbag 17 during inflation.

Figure 5:
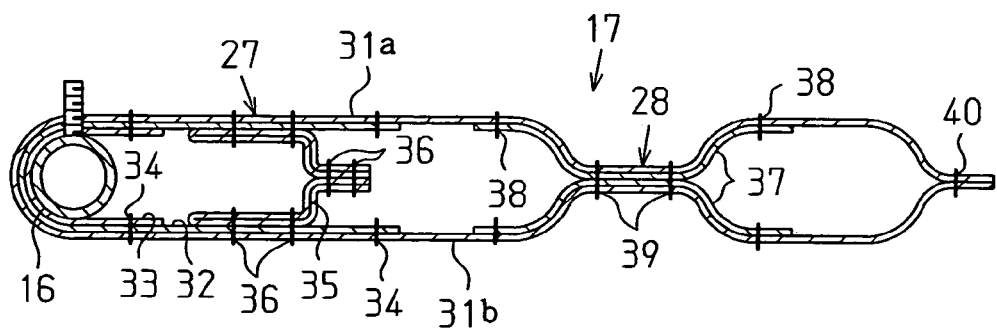
FIG. 5 is a cross-sectional view taken along line 5-5 of FIG. 4.

As shown in FIG. 5, the narrow section 27 is formed in the following manner. First, reinforcing fabric sheets 32, 33 are sewn to the inner surface of the fabric sheets 31a, 31b with sewing threads 34. Then, a tether 35 is sewn to the inner surface of the reinforcing fabric sheet 32 with sewing threads 36. The fabric sheets 31a, 31b are coupled to each other with the tether 35 in sections corresponding to the narrow section 27. When expanded gas is supplied to the airbag 17 from the inflator 16, the narrow section 27 prevents the corresponding sections of the fabric sheets 31a, 31b from separating from each other by a width equal to or greater than a predetermined distance. The narrow section 27 permits gas injected from the gas port 20 of the inflator 16 to be first supplied to the lower expansion portion 24. In FIG. 5, all the fabric sheets forming the airbag 17 are illustrated, while in other drawings, some of the fabric sheets are omitted.

The joined section 28 is formed in the following manner. That is, a reinforcing fabric sheet 37 is sewn to the inner surface of each of the fabric sheet 31a, 31b with sewing threads 38. Then, with the reinforcing fabric sheets 37 in between, the fabric sheets 31a, 31b are sewn to each other with sewing threads 39.

Further, in a part close to the distal end of the central expansion portion 25 (a part away from the inflator 16), a vent hole 41 is formed in the outside fabric sheet 31b. The vent hole 41 continuously discharges the expanded gas supplied to the airbag 17 from the inflator 16 at a constant rate.

A method for folding the airbag 17 will now be described.

Figure 6:
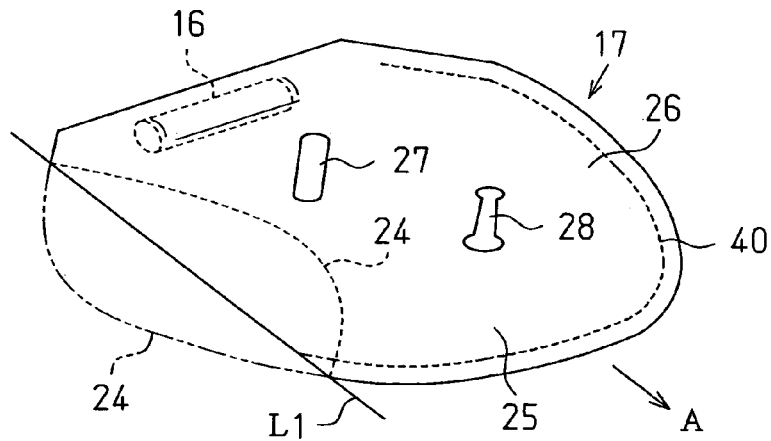
FIG. 6 is a perspective view for explaining to a method of folding the airbag of FIG. 1.
Figure 7:
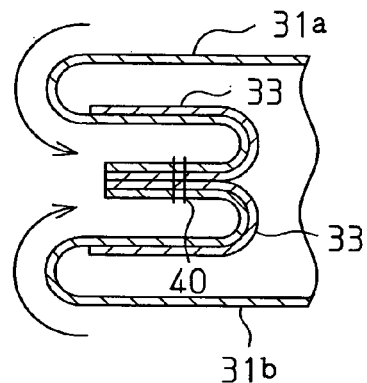
FIG. 7 is a partial cross-sectional view for explaining the method of folding the airbag of FIG. 1.

As shown in FIG. 6, the lower expansion portion 24 is folded at a folding line L1 that is parallel to the deploying direction of the airbag 17 indicated by arrow A, so that the lower expansion portion 24 is tucked in the central expansion portion 25 (tucking process of the lower expansion portion 24). In the tucking process of the lower expansion portion 24 in this embodiment, the lower expansion portion 24 is folded to be accommodated in the central expansion portion 25 as shown in FIG. 7. Accordingly, the lower expansion portion 24 is accommodated between the inside fabric sheet 31a and the outside fabric sheet 31b.

Figure 8:
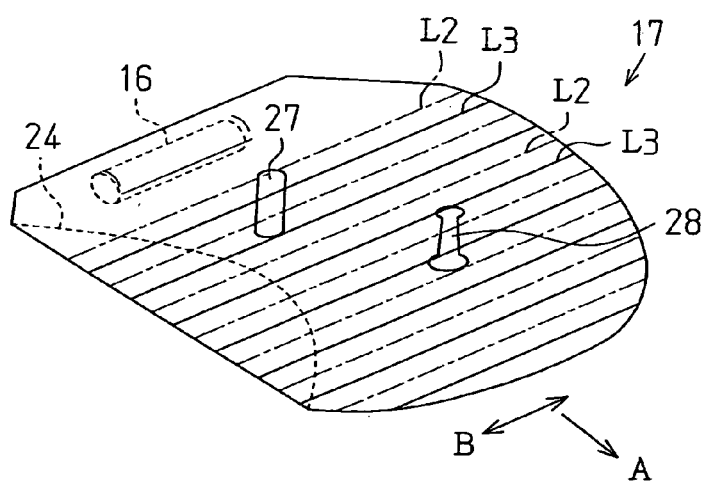
FIG. 8 is a perspective view for explaining the method of folding the airbag of FIG. 1.
Figure 9:
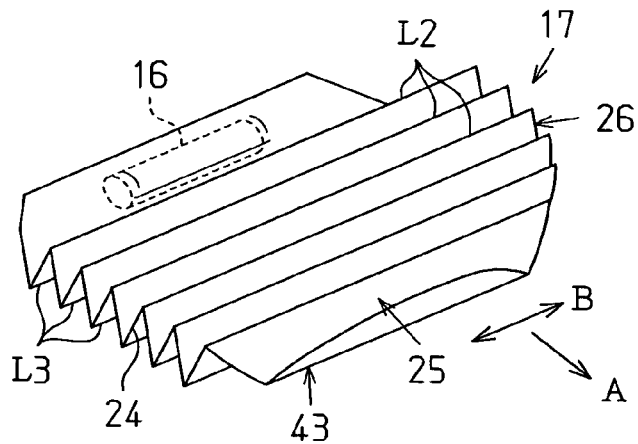
FIG. 9 is a perspective view for explaining the method of folding the airbag of FIG. 1.

Then, as shown in FIGS. 8 and 9, the airbag 17 is folded to form a bellows-like portion 43 along a number of folding lines L2, L3 that extend in the second direction (see arrow B) perpendicular to the deploying direction (the first direction) indicated by arrow A. In this process, the airbag 17 is folded into the bellows-like portion 43 such that the distal end of the airbag 17 (part farthest from the inflator 16 in the deploying direction) approaches the proximal end (part closest to the inflator 16 in the deploying direction) and that the folded layers are laminated along the deploying direction of the airbag 17.

Lastly, a bellows-like part 26A corresponding to the upper expansion portion 26, which is not tucked into the central expansion portion 25, is bent by 180° so that the bellows-like part 26A contacts the front side of a bellows-like part 25A of the central expansion portion 25. Accordingly, a reversed bellows-like portion 44 is formed. The bellows-like part 26A of the upper expansion portion 26 is bent within a plane that contains the deploying direction (first direction) indicated by arrow A and the second direction (arrow B) intersecting the deploying direction. The airbag 17, which is folded in this manner, is packaged in a storing bag 45 shown in FIG. 11 and is incorporated in the case 18 shown in FIG. 3.

The above described side airbag apparatus 14 operates in the following manner. When the impact sensor detects an impact equal to or greater than a predetermined level applied to the vehicle body, the control circuit outputs an activation signal to the inflator 16. Based on the activation signal, the expanded gas filling the inflator 16 is instantly supplied to the lower expansion portion 24 of the airbag 17 through the gas port 20. The injection of the expanded gas inflates and deploys the airbag 17 in the following manner.

Figure 10:
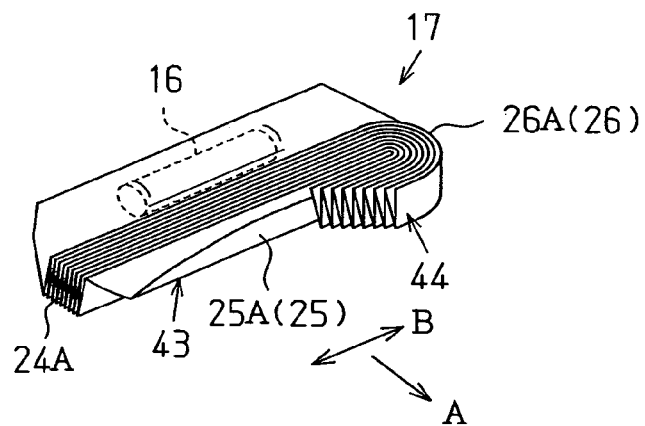
FIG. 10 is a perspective view for explaining the method of folding the airbag of FIG. 1.
Figure 11:
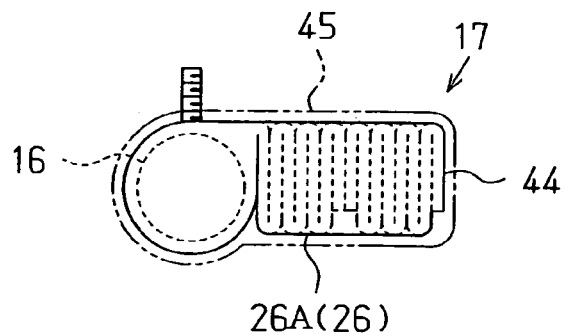
FIG. 11 is a side view for explaining the method of folding the airbag of FIG. 1.

First, a bellows-like part 24A of the lower expansion portion 24, which is tucked into the central expansion portion 25, is inflated and deployed (since located inside the central expansion portion 25, the bellows-like part 24A is not visible in FIGS. 9 and 10). In this state, the lower expansion portion 24 is expanded outward from the central expansion portion 25. The gas that has entered the lower expansion portion 24 then flows to the central expansion portion 25 to inflate and deploy the bellows-like part 25A of the central expansion portion 25. Thereafter, the bellows-like part 26A of the upper expansion portion 26 is inflated and deployed. Accordingly, the reversed bellows-like portion 44 of the upper expansion portion 26 is inflated and deployed.

The inflator 16 further continues supplying expanded gas. In this state, the expanded gas in the central expansion portion 25 of the airbag 17 is discharged to the outside of the airbag 17 at a constant rate through the vent hole 41. This prevents the pressure in the airbag 17 from being increased beyond a predetermined level. Also, since the vent hole 41 gradually discharges the expanded gas in the airbag 17, the hardness of the airbag 17 is adjusted so that the airbag 17 reduces the speed of the occupant P when receiving the occupant P colliding with the airbag 17. The inflation and deployment of the airbag 17 is thus completed.

The above described embodiment has the following advantages.

(1) In the illustrated embodiment, the airbag 17 is folded to form the bellows-like portion 43 after only the lower expansion portion 24 is tucked into the central expansion portion 25. Thereafter, the bellows-like part 26A of the upper expansion portion 26, which has not been tucked, is folded by 180° toward the front side of the bellows-like part 25A of the central expansion portion 25. Therefore, irrespective of the positions of the joined section 28 and the narrow section 27, the airbag 17 is packaged to be compact.

(2) In the illustrated embodiment, expanded gas from the inflator 16 is injected in a direction toward the lower expansion portion 24 in the airbag 17. Also, the narrow section 27 is provided in the airbag 17 to control the flow of expanded gas form the inflator 16 toward the lower expansion portion 24. Therefore, the expanded gas from the inflator 16 is readily supplied to the lower expansion portion 24. Accordingly, the pressure acting on the inner surfaces of the fabric sheets 31a, 31b that correspond to the lower expansion portion 24 is quickly increased, so that the downward deployment of the lower expansion portion 24 is accelerated in an initial stage of the deployment of the airbag 17. As a result, although the airbag 17 has a relatively large volume with the upper expansion portion 26 and the lower expansion portion 24, the inflation and deployment of the lower expansion portion 24 is completed early. Also, the quick deployment and inflation of the lower expansion portion 24 permit the central expansion portion 25 and the upper expansion portion 26 to be quickly inflated and deployed.

(3) In the illustrated embodiment, the joined section 28 is provided in the upper expansion portion 26 of the airbag 17. The joined section 28, the thickness of which is less than the other sections when the airbag 17 is deployed and inflated, corresponds to a shoulder of an occupant. Therefore, when the airbag 17 is deployed, the shoulder of the occupant is prevented from being pressed by an excessive degree. Accordingly, the occupant protection performance is improved.

(4) In the illustrated embodiment, the lower expansion portion 24 is tucked in the fabric sheets 31a, 31b that form the central expansion portion 25. This allows the lower expansion portion 24 to be quickly inflated and deployed. The airbag 17 therefore reliably protects the lumbar region of the occupant.

It should be apparent to those skilled in the art that the present invention may be embodied in many other specific forms without departing from the spirit or scope of the invention. Particularly, it should be understood that the invention may be embodied in the following forms.

Figure 12:
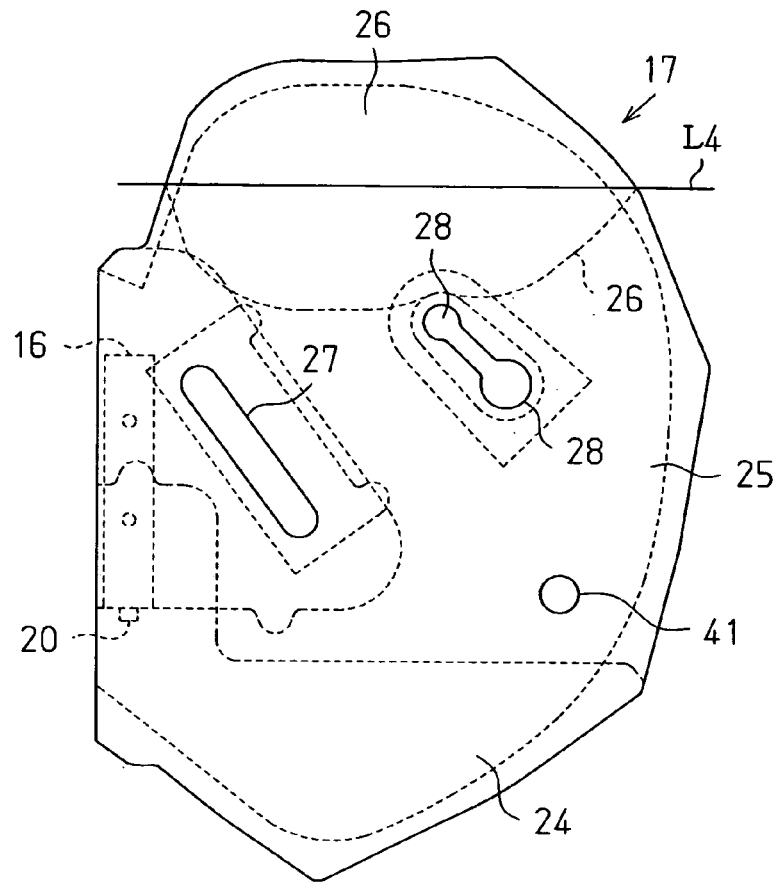
FIG. 12 is a front view illustrating an airbag according to another embodiment of the present invention.
Figure 12:
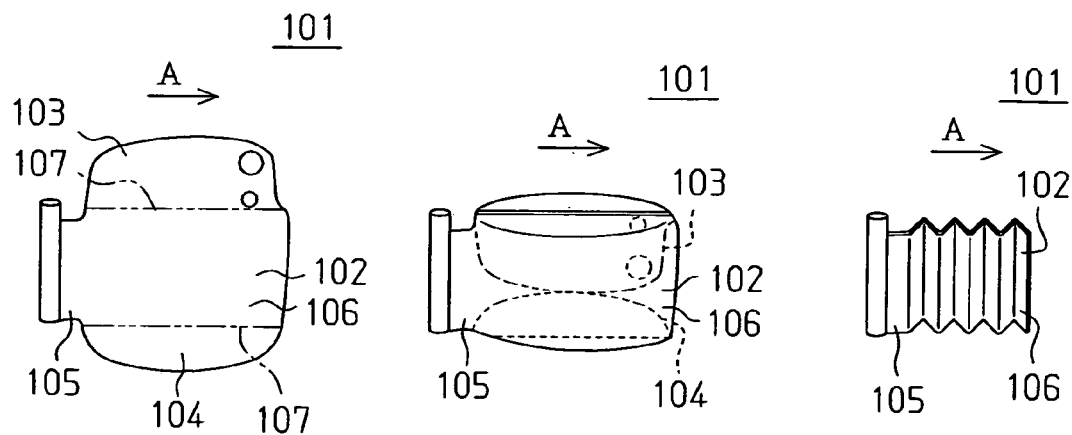

FIG. 12 shows an airbag 17 according to another embodiment. Compared to the airbag 17 of the embodiment in FIGS. 1 to 11, an upper expansion portion 26 of the airbag 17 shown in FIG. 12 is enlarged upward. As indicated by a broken line in FIG. 12, only the upper expansion portion 26 is folded at a folding line L4 parallel to the deployment direction (see arrow A in FIG. 6) and tucked into the central expansion portion 25. Thereafter, as in the bellows form folding described in the embodiment of FIGS. 1 to 11, the airbag 17 is folded to form a bellows-like portion (see FIG. 9). Then, a lower expansion portion 24, which is not tucked, is bent by 180° to contact the front side of the bellows-like part of the central expansion portion 25.

The method of FIG. 12 also permits the airbag 17 to be compactly packaged as the method of FIGS. 1 to. 11.

The airbag 17 may be folded to form a bellows-like portion according to the above embodiments before the inflator 16 is incorporated in the airbag 17.

The narrow section 27 may be provided in a position in the central expansion portion 25 that corresponds to the armrest 15a of the door 15. The joined section 28 may be provided in a position in the upper expansion portion 26 that corresponds to a shoulder of the occupant.

In the illustrated embodiments, the case 18 of the airbag apparatus 14 may be omitted. In this case, part of the seat 11 may be used as a case. Alternatively, the cushion of the seat 11 may be used as a case.

In the illustrated embodiments, the airbag 17 is formed by sewing the inside fabric sheet 31a and the outside fabric sheet 31b to each other. However, the airbag 17 may be formed through a hollow weave.

In the illustrated embodiments, the airbag 17 is formed of fabric sheets. However, the airbag 17 may be formed, for example, of unwoven fabric sheets or sheets of synthetic resin film.

In the illustrated embodiment, the inflator 16 may be located outside the airbag 17. In this case, expanded gas in the inflator 16 is supplied to the airbag 17, for example, through a hose.

The airbag apparatus of the present invention may be used for seats other than the driver's seat. For example, the apparatus may be applied to the airbag apparatus attached to a side a front passenger seat. Further, in a vehicle has three rows of seats, the present invention may be applied to the airbag apparatus attached to a side of the second seat or the third seat.

Therefore, the present examples and embodiments are to be considered as illustrative and not restrictive and the invention is not to be limited to the details given herein, but may be modified within the scope and equivalence of the appended claims.

What is claimed is:

1. A method for folding an airbag attached to a side of a vehicle seat, wherein the airbag is deployed and inflated from the side of the seat in a predetermined first direction such that the airbag is located between a sidewall of a body of the vehicle and an occupant seated on the seat, wherein, with respect to the first direction, the airbag has a proximal end close to the side of the seat and a distal end separated from the side of the seat, wherein the airbag includes a lower expansion portion, a central expansion portion, and an upper expansion portion, wherein, when the airbag is deployed, the lower expansion portion corresponds to the lumbar region of the occupant seated on the seat, the central expansion portion corresponds to the abdomen of the occupant, and the upper expansion portion corresponds to a shoulder of the occupant, wherein, with respect to a second direction that intersects the first direction, the lower expansion portion and the upper expansion portion are located at the sides of the central expansion portion, the method comprising:

folding the lower expansion portion or the upper expansion portion along a folding line that extends along the first direction such that the folded expansion portion is tucked in the central expansion portion;

folding the airbag to form a pleated portion after tucking the expansion portion, such that the distal end and the proximal end of the airbag approach each other and that folded layers are laminated along the first direction; and after forming the pleated portion, bending a part of the pleated portion that corresponds to the untucked one of the lower and upper expansion portions substantially by 180° within a plane containing the first and second directions, so that the bent part approaches a part of the pleated portion that corresponds to the central expansion portion.

2. The method according to claim 1, wherein the lower expansion portion is tucked to be accommodated between facing parts of fabric forming the airbag.

3. An airbag apparatus for a vehicle, the airbag apparatus having an airbag and a gas supplying device, and being attached to a side of a vehicle seat, wherein, when gas is supplied to the airbag from the gas supplying device, the airbag is deployed and inflated from the side of the seat in a predetermined first direction such that the airbag is located between a sidewall of a body of the vehicle and an occupant seated on the seat, wherein, with respect to the first direction, the airbag has a proximal end close to the side of the seat and a distal end separated from the side of the seat, wherein the airbag includes:
- a lower expansion portion that corresponds to the lumbar region of the occupant seated on the seat when the airbag is deployed;
- a central expansion portion that corresponds to the abdomen of the occupant when the airbag is deployed; and
- an upper expansion portion that corresponds to a shoulder of the occupant when the airbag is deployed, wherein, with respect to a second direction that intersects the first direction, the lower expansion portion and the upper expansion portion are located at the sides of the central expansion portion,
- wherein, prior to deployment, the airbag is folded in a predetermined manner, in which manner, the lower expansion portion or the upper expansion portion is folded along a folding line that extends along the first direction such that the folded expansion portion is tucked in the central expansion portion, the airbag is folded to form a pleated portion such that the distal end and the proximal end approach each other and that folded layers are laminated along the first direction, and wherein a part of the pleated portion that corresponds to the untucked one of the lower and upper expansion portions is bent substantially by 180° within a plane containing the first and second directions, so that the bent part approaches a part of the pleated portion that corresponds to the central expansion portion.

4. The airbag apparatus according to claim 3, wherein the lower expansion portion is tucked to be accommodated between facing parts of fabric forming the airbag.

5. The airbag apparatus according to claim 3, wherein the airbag is configured to cause gas supplied from the gas supplying device to be injected toward the lower expansion portion.

6. The airbag apparatus according to claim 3, further comprising a gas flow controlling section that controls the flow of gas from the gas supplying device to be directed to the lower expansion portion.

7. The airbag apparatus according to claim 3, wherein the airbag has a narrow section the thickness of which is less than the other portions when the airbag is inflated, and wherein the narrow section is located at or in the vicinity of a part of the airbag that corresponds to an armrest provided on the sidewall of the body when the airbag is inflated.

8. The airbag apparatus according to claim 3, wherein the airbag has a joined section where facing parts of the airbag are fastened to each other, and wherein the joined section is located at or in the vicinity of a part of the airbag that corresponds to a shoulder of the occupant when the airbag is inflated.

9. An airbag attached to a side of a vehicle seat, wherein the airbag is deployed and inflated from the side of the seat in a predetermined first direction such that the airbag is located between a sidewall of a body of the vehicle and an occupant seated on the seat, wherein, with respect to the first direction, the airbag has a proximal end close to the side of the seat and a distal end separated from the side of the seat, wherein the airbag includes a lower expansion portion, a central expansion portion, and an upper expansion portion, wherein, when the airbag is deployed, the lower expansion portion corresponds to the lumbar region of the occupant seated on the seat, the central expansion portion corresponds to the abdomen of the occupant, and the upper expansion portion corresponds to a shoulder of the occupant, wherein, with respect to a second direction that intersects the first direction, the lower expansion portion and the upper expansion portion are located at the sides of the central expansion portion, and wherein, prior to deployment, the airbag is folded in a predetermined manner, in which manner, the lower expansion portion or the upper expansion portion is folded along a folding line that extends along the first direction such that the folded expansion portion is tucked in the central expansion portion, the airbag is folded to form a pleated portion such that the distal end and the proximal end approach each other and that folded layers are laminated along the first direction, and wherein a part of the pleated portion that corresponds to the untucked one of the lower and upper expansion portions is bent substantially by 180° within a plane containing the first and second directions, so that the bent part approaches a part of the pleated portion that corresponds to the central expansion portion.

10. The method according to claim 1, wherein said bending apart of the pleated portion includes bending the part in a pivoting manner substantially by 180° within the plane containing the first and second directions, so that the bent part faces in the first direction.

11. The airbag apparatus according to claim 3, wherein the part of the pleated portion that corresponds to the untucked one of the lower and upper expansion portions is bent in a pivoting manner substantiaily by 180° within the plane containing the first and second directions, so that the bent part faces in the first direction and approaches the part of the pleated portion that corresponds to the central expansion portion.

12. The airbag according to claim 9, wherein the part of the pleated portion that corresponds to the untucked one of the lower and upper expansion portions is bent in a pivoting manner substantially by 180° within the plane containing the first and second directions, so that the bent part faces in the first direction and approaches the part of the pleated portion that corresponds to the central expansion portion.

* * * * *